(12) United States Patent  
Saeki (10) Patent No.: US 11,420,509 B2  
(45) Date of Patent: Aug. 23, 2022

(54) VEHICLE LOWER STRUCTURE

(71) Applicant: Toyota Jidosha Kabushiki Kaisha, Toyota (JP)

(72) Inventor: Koji Saeki, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 218 days.

(21) Appl. No.: 16/736,051

(22) Filed: Jan. 7, 2020

(65) Prior Publication Data

US 2020/0223303 A1 Jul. 16, 2020

(30) Foreign Application Priority Data

Jan. 11, 2019 (JP) .............................. JP2019-003104

(51) Int. Cl.

| | |
|---|---|
| *B60K 1/00* | (2006.01) |
| *B60K 1/04* | (2019.01) |
| *B60R 22/26* | (2006.01) |
| *B62D 25/20* | (2006.01) |
| *B60N 2/015* | (2006.01) |

(52) U.S. Cl.  
CPC ............... *B60K 1/04* (2013.01); *B60N 2/015* (2013.01); *B60R 22/26* (2013.01); *B62D 25/20* (2013.01); *B60K 2001/0433* (2013.01)

(58) Field of Classification Search  
CPC .. B60K 1/04; B60K 6/28; B60N 2/015; B60L 58/26; B60L 58/21  
See application file for complete search history.

(56) References Cited

U.S. PATENT DOCUMENTS

| | | | | |
|---|---|---|---|---|
| 7,051,825 | B2 * | 5/2006 | Masui | B60L 3/0046 180/68.5 |
| 8,875,827 | B2 * | 11/2014 | Watanabe | B60L 58/26 180/68.5 |
| 9,308,805 | B2 * | 4/2016 | Shiromura | B60L 50/64 |
| 9,956,861 | B2 * | 5/2018 | Nomura | B60K 6/28 |
| 2003/0186115 | A1 * | 10/2003 | Shibasawa | H01M 50/20 429/100 |
| 2011/0300427 | A1 * | 12/2011 | Iwasa | H01M 50/20 429/99 |
| 2014/0008137 | A1 * | 1/2014 | Shiromura | B60L 58/21 180/68.5 |
| 2016/0301120 | A1 | 10/2016 | Katsuno et al. | |
| 2017/0267059 | A1 * | 9/2017 | Koyama | B60N 2/015 |
| 2018/0015806 | A1 * | 1/2018 | Yasuda | B60H 1/00385 |
| 2018/0050606 | A1 * | 2/2018 | Sugitate | H01M 10/6563 |
| 2018/0065458 | A1 * | 3/2018 | Ogawa | B60K 1/04 |
| 2018/0126835 | A1 * | 5/2018 | Saeki | B62D 21/02 |

FOREIGN PATENT DOCUMENTS

| | | |
|---|---|---|
| JP | 2001-150986 A | 6/2001 |
| JP | 2009-149225 A | 7/2009 |
| JP | 2016-199105 A | 12/2016 |
| JP | 2017-13639 A | 1/2017 |
| JP | 2018-75878 A | 5/2018 |

* cited by examiner

*Primary Examiner* — Hau V Phan  
(74) *Attorney, Agent, or Firm* — Dinsmore & Shohl LLP (57) ABSTRACT

A floor anchor for supporting a webbing waist portion of a seat belt mechanism is supported by a seat rail that is a frame member of a seat cushion. The seat rail is supported by a rear floor panel through a fastening panel that is a holding member. An end portion of a battery pack is also supported by the floor panel through the fastening panel.

3 Claims, 8 Drawing Sheets

PRIOR ART

FIG. 8

VEHICLE LOWER STRUCTURE

CROSS REFERENCE TO RELATED APPLICATION

This application claims priority to Japanese Patent Application No. 2019-003104, filed on Jan. 11, 2019, which is incorporated herein by reference in its entirety.

TECHNICAL FIELD

The present disclosure particularly relates to a lower structure of a vehicle in which a battery pack is disposed under a seat.

BACKGROUND

In a hybrid vehicle or an electric vehicle using a rotary electric machine as a drive source, a battery pack is mounted as a power source. For example, in JP 2016-199105 A, a battery pack is mounted under a rear seat and on a floor panel.

The battery pack, which is a heavy load, is supported by a frame member of a vehicle. For example, referring to FIG. 7, a front end of a battery pack 500 is supported by a floor cross member 510 that is a frame member. A rear end of the battery pack 500 is supported by a battery bracket 520.

Figure 7:
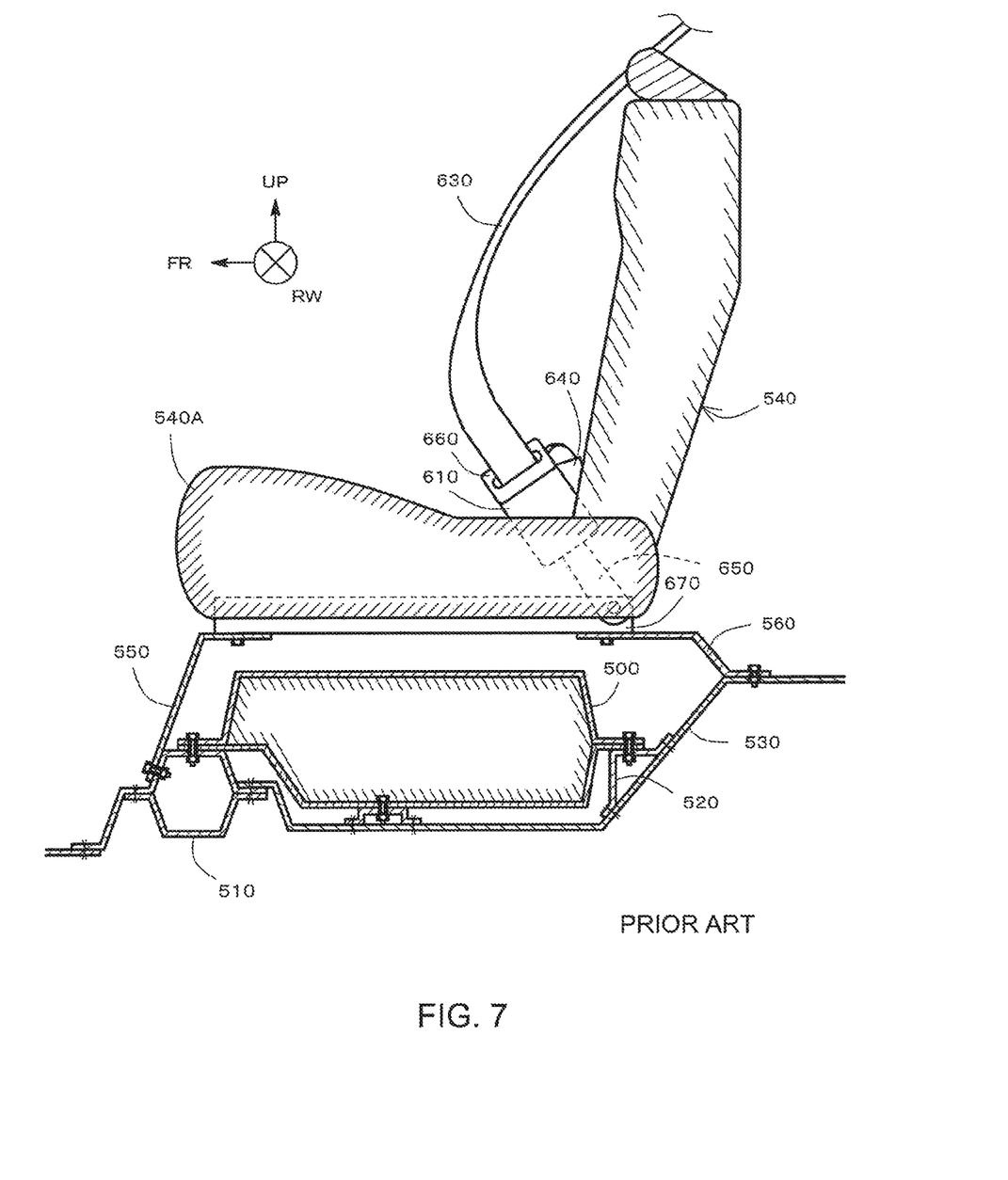
FIG. 7 is a view showing an example of a conventional vehicle lower structure.

Moreover, a front end of a rear seat 540 is supported by the floor cross member 510 through a seat front bracket 550. A rear end of the rear seat 540 is fixed to a rear floor panel 530 through a seat rear bracket 560.

A seat belt mechanism is attached to the rear seat 540. The seat belt mechanism includes webbing that is a so-called belt part, and an anchor that supports the webbing on a vehicle body. Referring to FIG. 7, for example, a three-point seat belt mechanism includes a shoulder anchor (not shown) provided above a pillar and supporting one end (the upper end) of webbing 630, and two floor anchors 640, 650 provided at both respective in a vehicle width direction of a waist portion of the webbing 630 (waist belt part). One floor anchor 640 supports another end (the lower end) of the webbing 630. The other floor anchor 650 supports a buckle 610 into which a tongue 660 attached to the webbing 630 is to be inserted.

The floor anchors 640, 650 are fastened to a seat rail 670 that is a frame member provided on a seat cushion 540A of the rear seat 540. Further, the seat rail 670 is fastened to the rear floor panel 530 through the seat rear bracket 560.

Incidentally, various safety standards are specified for seat belt mechanisms. For example, the belt anchor mechanisms including shoulder anchors and floor anchors, safety standards for strength and so on are specified.

For example, according to Regulation 14 specified by the United Nations Economic Commission for Europe (UN/ECE), as a so-called belt anchor test, a crash test dummy is placed on a seat and restrained with a seat belt, and then a speed fluctuation (acceleration and deceleration) of 50 km/h or more is applied. Furthermore, angular displacement of the belt anchor mechanism when the speed fluctuation is applied is measured. For example, when the angular displacement of the floor anchor is within 10°, it is determined that a safety standard is satisfied.

Figure 8:
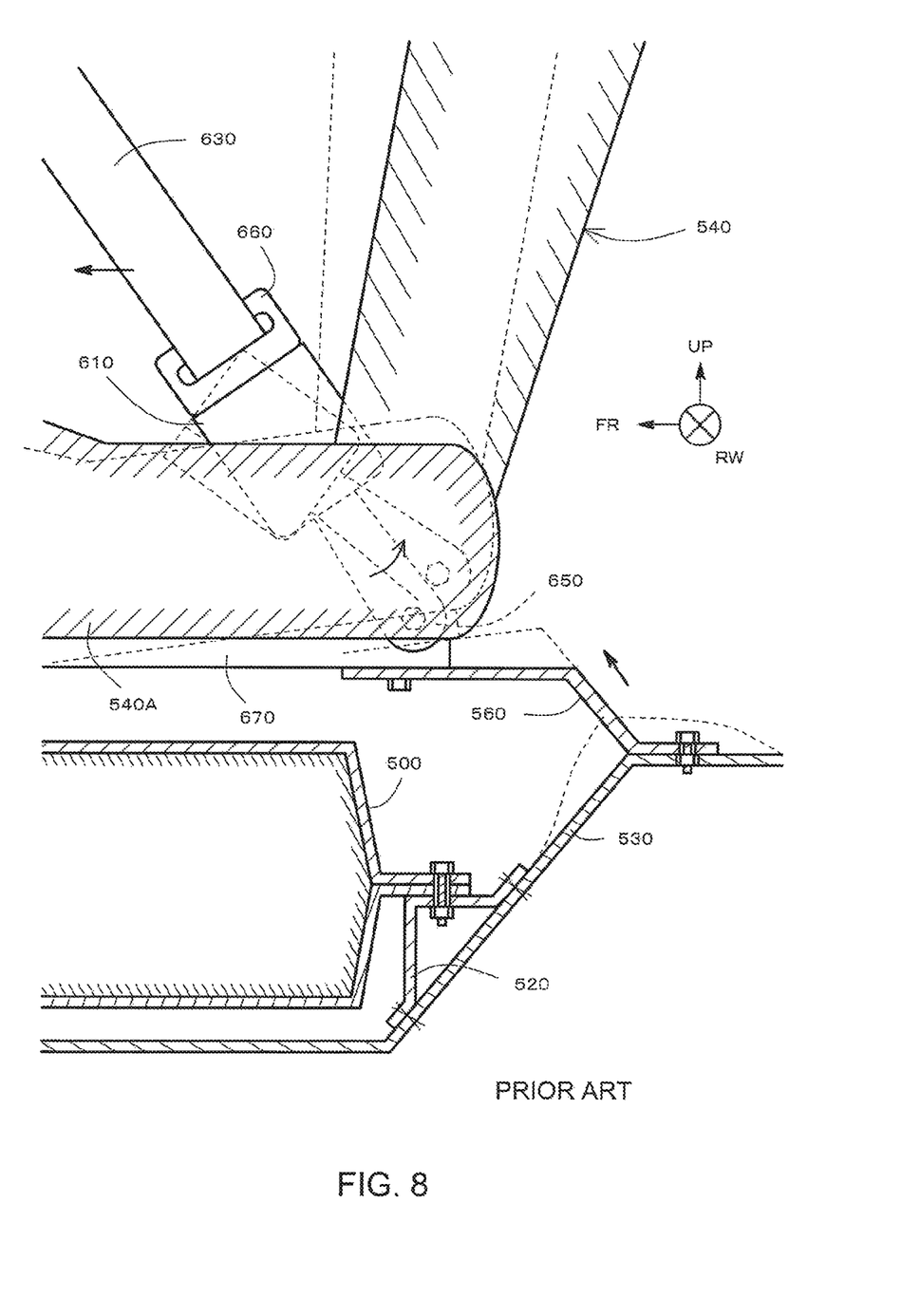
FIG. 8 is a view showing an example of a conventional vehicle lower structure and a state when a tensile load is input to a floor anchor.

Here, referring to FIG. 8, in the belt anchor test, when the crash test dummy is restrained with the webbing 630 at the time of an abrupt stop, a tensile load toward the front of the vehicle is applied to the seat rear bracket 560 via the buckle 610 and the floor anchor 650. At this time, the rear floor panel 530 to which a lower surface of the seat rear bracket 560 is fastened is lifted up and deformed as indicated by a broken line, and, as a result, the angle of the floor anchor 650 may be displaced.

In order to restrain the angular displacement of the floor anchor 650, it is conceivable to increase the rigidity of the seat rear bracket 560 and the rear floor panel 530 to which the seat rear bracket 560 is fastened, but there is a possibility of causing an increase in the cost and weight of the vehicle.

Accordingly, it is an advantage of the present disclosure to provide a vehicle lower structure capable of restraining the angular displacement of the belt anchor mechanism when a load is input, while restraining an increase in the coat and weight of the vehicle.

SUMMARY

The present disclosure relates to a vehicle lower structure including: a battery pack disposed on a floor panel; and a seat disposed on the battery pack. In the vehicle lower structure, a floor anchor for supporting a waist portion of webbing of a seat belt mechanism is supported by a frame member of a seat cushion of the seat. The frame member of the seat cushion is supported by the floor panel through a holding member. Further, an end portion of the battery pack is also supported by the floor panel through the holding member.

According to the above configuration, when a tensile load toward the front of the vehicle is input to the floor anchor, the same tensile load is also input to the holding member that holds the floor anchor. At this time, since the battery pack is also supported by the holding member, lifting of the holding member is restrained by the weight of the battery pack. As a result, it is possible to restrain the angular displacement of the belt anchor mechanism at the time of input of a load without needing to increase the rigidity of the holding member and the floor panel. Moreover, according to the above configuration, holding members for the floor anchor and the battery pack which are provided separately in a conventional structure are made one structure, and therefore an increase in the cost and weight of the vehicle can be restrained.

In the above disclosure, the holding member may extend in a vehicle width direction. In this case, the holding member has a plurality of seat support points for supporting the frame member of the seat cushion, and a plurality of battery support points for supporting an end portion of the battery pack, which are formed alternately along the vehicle width direction. Further, the separation distance between each of the seat support points and the corresponding battery support point is equal throughout the plurality of the seat support points and a plurality of the battery support points.

According to the above configuration, when a tensile load is input to the seat support point, the tensile load is evenly distributed to the battery support points arranged equal intervals.

According to the present disclosure, it is possible to restrain the angular displacement of the belt anchor mechanism when a load is input, while restraining an increase in the cost and weight of the vehicle.

BRIEF DESCRIPTION OF DRAWINGS

An embodiment of the present disclosure be described based on the following figures, wherein.

DESCRIPTION OF EMBODIMENT

Figure 1:
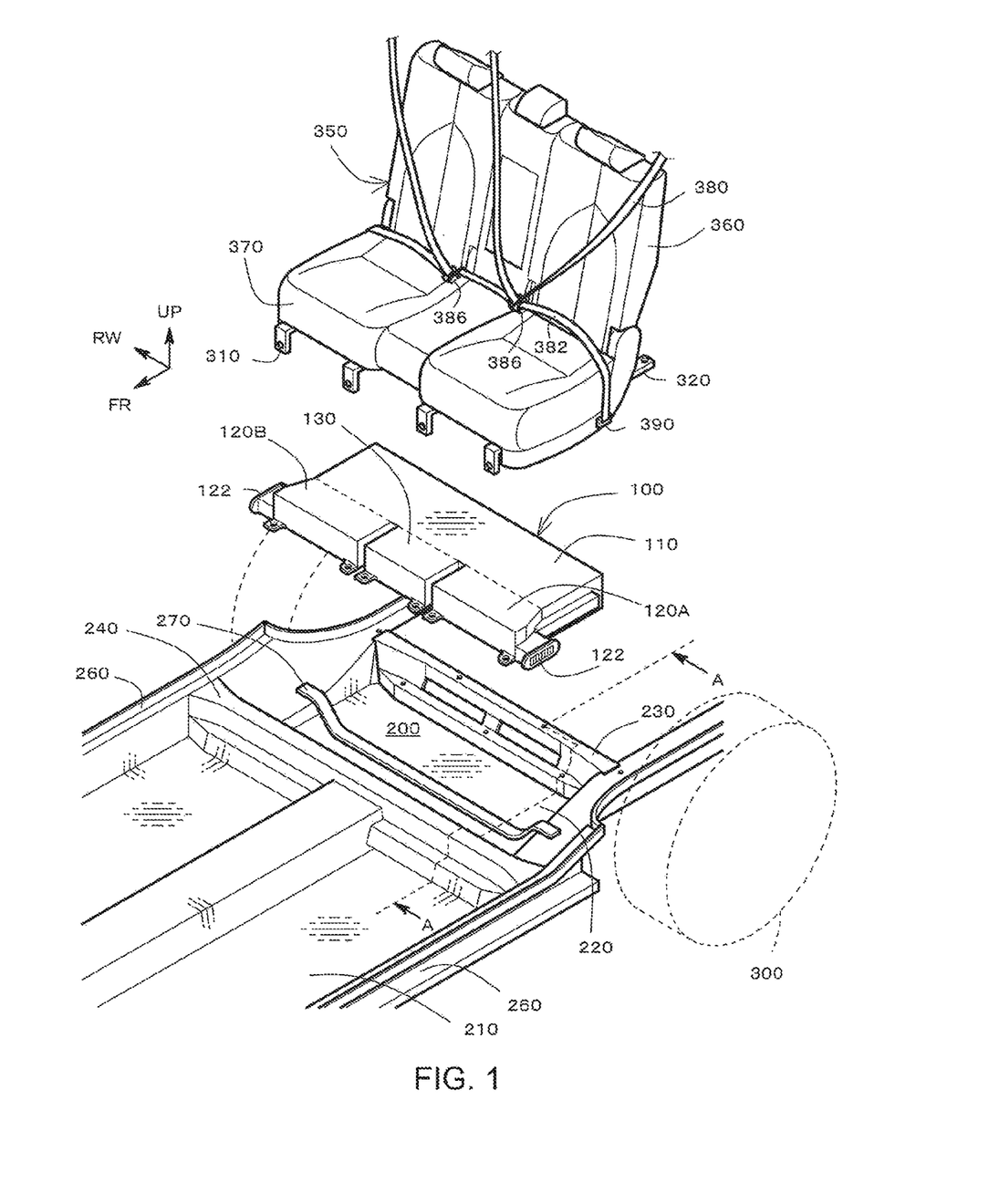
FIG. 1 is an exploded perspective view showing an example of a lower structure of a vehicle according to the embodiment.

FIG. 1 shows an example of a vehicle lower structure according to the present embodiment. In FIGS. 1 to 6, a vehicle front-rear direction is shown by an axis indicated as FR, a vehicle width direction is shown by an axis indicated as RW, and a vehicle up-down direction is shown by an axis indicated as UP. The vehicle front-rear axis FR defines a vehicle frontward direction as a positive direction. The vehicle width axis RW defines a rightward width direction as a positive direction. The vehicle up-down axis UP defines an upward direction as a positive direction. These three axes are orthogonal to each other.

The vehicle lower structure according to the present embodiment is mounted, for example, in a hybrid vehicle or an electric vehicle using a rotary electric machine as a drive source. The vehicle lower structure according to the present embodiment includes a battery pack 100 disposed on a rear floor panel 220, and a rear seat 350 disposed on the battery pack 100.

In the vehicle lower structure according to the present embodiment, a rear end of the battery pack 100 and a seat rail 372 (see FIG. 3) are supported by a fastening panel 230. When a tensile load toward the front of the vehicle is applied to floor anchors 388, 390 of a seat belt mechanism, the fastening, panel 230 receives the tensile load from the floor anchors 388, 390 through a seat rear bracket 320 and the seat rail 372. At this time, lifting, of the fastening panel 230 is restrained by the weight of the battery pack 100. As a result, changes in the angles of the floor anchors 388, 390 are restrained. The above structure will be described later.

Figure 2:
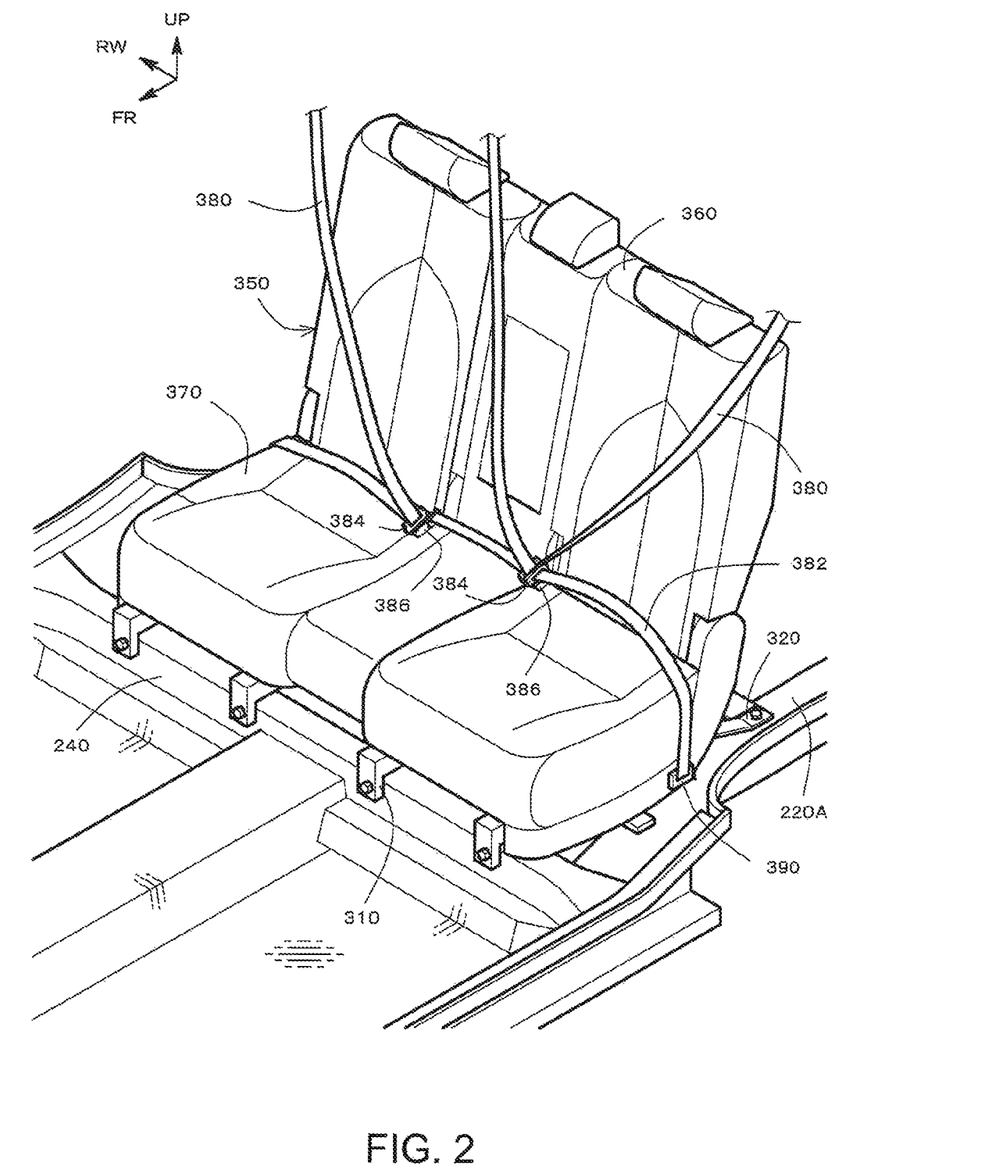
FIG. 2 is a perspective view showing an example of a rear seat and a seat belt mechanism.

FIG. 2 shows an example when the rear seat 350 is attached to a vehicle body. In order to clarify a fastening structure, illustration of mats which are placed on a floor panel, such as a floor mat and a floor silencer, is omitted.

Figure 3:
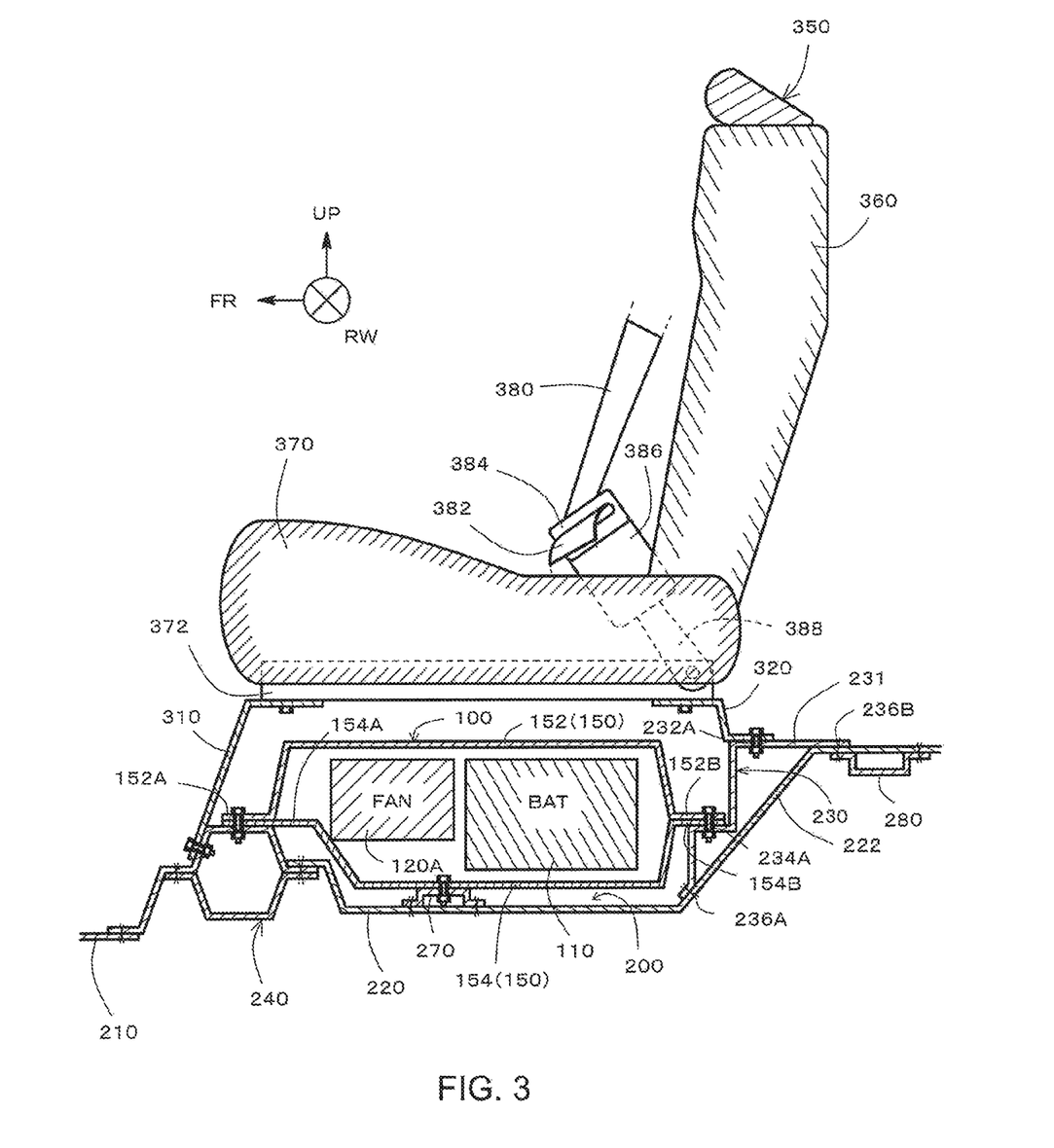
FIG. 3 is a cross-sectional view along a line A-A of FIG. 1.

The rear seat 350 is, for example, a bench seat that can seat three people. The rear seat 350 includes a seat back 360 that is a backrest portion, and a seat cushion 370 that is a seat portion. FIG. 3 shows a cross-sectional view of the rear seat 350 as an example. The seat rail 372 as a frame member extends in the vehicle front-rear direction under the seat cushion 370. Although not shown, a seat frame, which is another frame member, extends in the vehicle width direction under the seat cushion 170.

The rear seat 350 is provided with a seat belt mechanism. In FIGS. 1 and 2, for example, a three-point seat belt mechanism is illustrated. The seat belt mechanism includes webbing representing a so-called belt part, a buckle 386, the floor anchor 390, and a retractor (winding device) (not shown).

The webbing includes a webbing shoulder portion 380 for restraining the upper body of an occupant, and a webbing waist portion 382 for restraining around the waist of the occupant. Referring to FIG. 3, the webbing is inserted into a tongue 384. When an end portion of the tongue 384 is inserted into and fixed to the buckle 386, an upper portion of the webbing relative to the tongue 384 serves as the webbing shoulder portion 380, and a lower portion (on the floor anchor 390 side) relative to the tongue 384 serves as the webbing waist portion 382.

The webbing is supported by the vehicle body through anchors. For example, an upper end of the webbing shoulder portion 380 is supported by a shoulder anchor (not shown). The shoulder anchor is installed, for example, above a pillar.

The ends of the webbing waist portion 382 in the vehicle width direction are supported by the floor anchors 388, 390, respectively. Referring to FIG. 3, the floor anchor 388 is attached to a lower end of the buckle 386 and fastened to the seat rail 372 that is the frame member of the seat cushion 370. The floor anchor 390 fixes and supports a lower end of the webbing, and is fastened to the seat rail 372. Therefore, when the vehicle carrying an occupant or a crash test dummy in the rear seat makes an abrupt stop, a tensile load toward the front of the vehicle is input to the webbing waist portion 382, and the tensile load is transmitted to the seat rail 372 through the floor anchors 388, 390.

The seat rail 372 is supported by the rear floor panel 220 through the seat rear bracket 320 and the fastening panel 230 as a holding member. That is, a rear end of the seat rail 372 is fastened to the seat rear bracket 320. The seat rear bracket 320 has, for example, a step shape in which the vehicle height position on the rear side of the vehicle is lower relative to the front side of the vehicle, and the rear end of the seat rail 372 is fastened to the front portion in the relatively high position. Further, the rear portion in the relatively low position is fastened to an upper horizontal portion 231 of the fastening panel 230. With such a step shape, a gap in the vehicle height direction is provided between the seat rail 372 constituting a bottom surface of the rear seat 350 and a case cover 152 constituting a top surface of the battery pack 100.

Referring to FIGS. 1 and 3, a battery storage space 200 is formed under the rear seat 350 and on the rear floor panel 220, and the battery pack 100 is disposed in this space. The battery storage space 200 is a part of the rear floor panel 220, and is provided between a floor cross member 240 and the fastening panel 230 in the vehicle front-rear direction.

Referring to FIG. 3, a front end of the rear floor panel 220 is joined to a rear end of the floor cross member 240. In FIG. 3 and so on, a welding point is indicated by an X mark. The rear floor panel 220 is a floor plate on the rear side of the vehicle, and a kick-up portion 222 sloping upward toward the rear side is provided around rear wheels 300 (see FIG. 1) to secure a space for a suspension mechanism of the rear wheels 300, etc. The space between the kick-up portion 222 and the floor cross member 240 serves as the battery storage space 200.

Referring to FIG. 1, the battery pack 100 includes a battery module 110, cooling fans 120A, 120B, and a control unit 130 which are stored in a case 150 (see FIG. 3). The case 150 includes the case cover 152 that is an upper member, and a case tray 154 that is a lower member. In the case 150, the battery module 110 is disposed closer to the rear wheels 300 than are the cooling fans 120A, 120B and the control unit 130.

The cooling fans 120A, 120B send cooling air to the battery module 110. For example, the cooling fans 120A, 120B are mounted on both sides in the vehicle width direction with the control unit 130 therebetween. The cooling fans 120A, 120B are constituted by, for example, sirocco fans.

In addition, inlets 122 are provided at end portions of the cooling fans 120A, 120B in the vehicle width direction. Air in a vehicle compartment is sucked from the inlets 122, and the air is sent as the cooling air to the battery module 110.

The control unit 130 performs power management of the battery module 110. For example, the control unit 130 may be a so-called battery ECU (electronic control unit) constituted by a computer. The control unit 130 performs, for example, charge and discharge management and temperature management for the battery module 110.

The battery module 110 includes a stack of a plurality of unit batteries, also called unit cells, which are arranged one on top of another. For example, a single cell may be a lithium ion secondary battery or a nickel hydride secondary battery, or may be an all-solid-state battery.

In order to sufficiently secure an electric travel distance for the vehicle, many single cells are stacked in the battery module 110. Therefore, the battery module 110 is a heavy load, and, for example, the weight of the entire battery pack 100 is more than 100 kg.

Referring to FIG. 3, in the battery pack 100, the battery module 110 is disposed on the rear side relative to the cooling fans 120A, 120B and the control unit 130. That is, in the battery pack 100, the battery module 110 is disposed closer to the rear side. Consequently, the center of gravity of the battery pack 100 is located closer to the rear side that is, closer to the fastening panel 230, and, when the fastening panel 230 is going to be lifted as to be described later, it is possible to efficiently restrain the lifting.

The battery pack 100 is detachably fastened to the vehicle body with bolts and nuts, or the like. Specifically, referring to FIG. 3, the front end of the battery pack 100; that is, a front end flange 152A of the case cover 152 and a front end flange 154A of the case tray 154 are fastened to and supported by the floor cross member 240 extending in the vehicle width direction. Referring to FIG. 1, a pair of rockers 260, 260, which are frame members extending in the vehicle front-rear direction, are provided at both ends (ends on both sides) in the vehicle width direction of the vehicle compartment. Both ends in the vehicle width direction of the floor cross member 240 are fixed to the pair of rockers 260, 260.

Referring to FIG. 3, a substantially central portion of the case tray 154 in the vehicle front-rear direction is fastened to and supported by a battery cross 270 that is a frame member extending in the vehicle width direction. Moreover, referring to FIG. 5, a rear end flange 152B of the case cover 152 and a rear end flange 154B of the case tray 154 are fastened to and supported by a lower horizontal portion 233 of the fastening panel 230.

Figure 5:
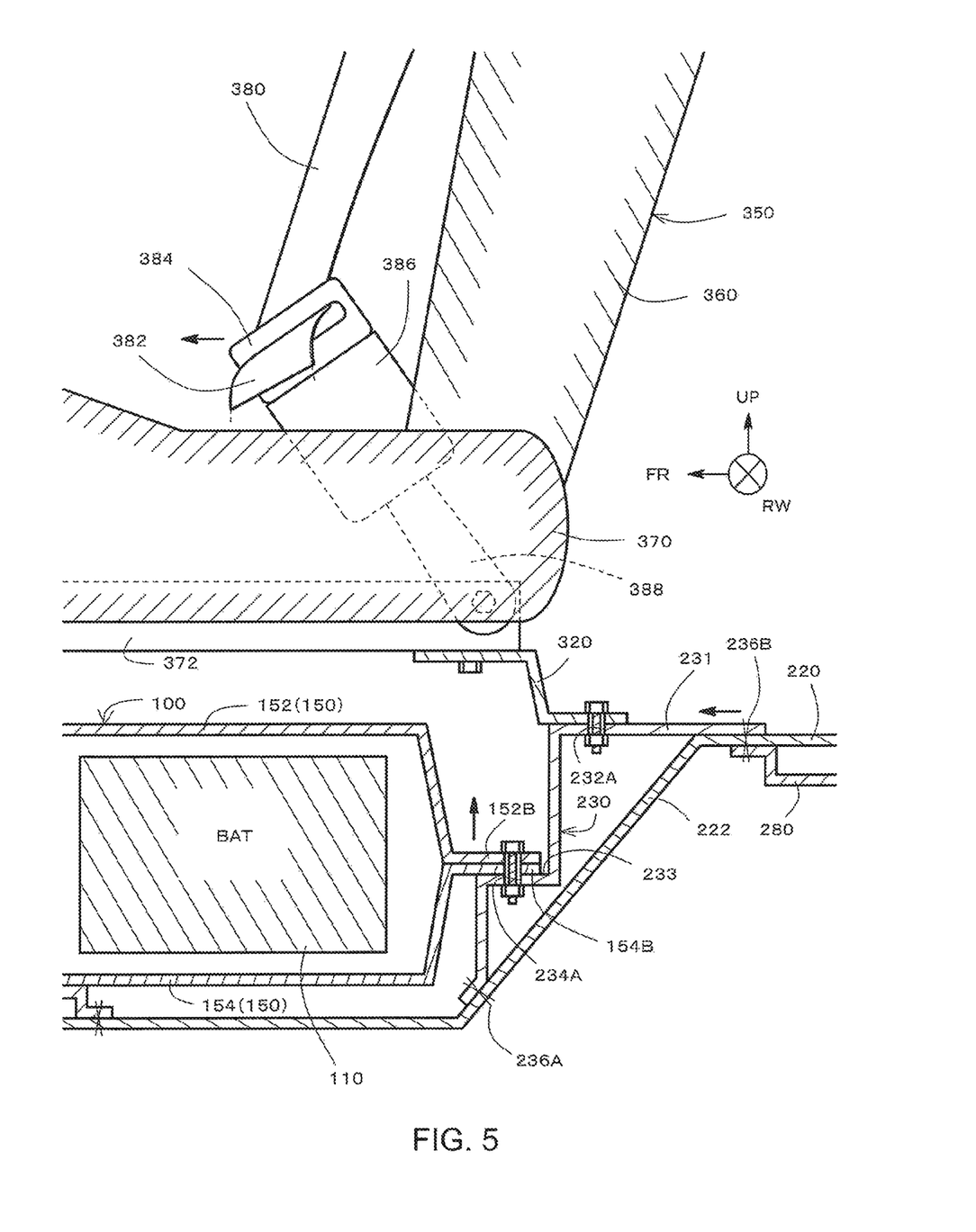
FIG. 5 is an enlarged cross-sectional view of FIG. 3.

Referring to FIG. 5, the fastening panel 230 is installed in the kick-up portion 222 having an inclined shape in a side view. The fastening panel 230 is a holding member for supporting the rear end flanges 152B, 154B which are the end portion of the battery pack 100, and the seat rear bracket 320. The fastening panel 230 is formed to have strength similar to that of the seat rear bracket 320, for example, and the same thickness as the seat rear bracket 320, for example.

As described later, the seat rail 372 of the rear seat 350 is supported by the rear floor panel 220 through the fastening panel 230. The rear end flanges 152B, 154B as the end portion of the battery pack 100 are also supported by the rear floor panel 220 through the fastening panel 230.

The fastening panel 230 has, for example, a step shape in order to provide a horizontal fastening surface around the kick-up portion 222 having an inclined surface. Specifically, the fastening panel 230 includes the upper horizontal portion 231 and the lower horizontal portion 233.

The seat rear bracket 320 is detachably fastened to and supported by the upper horizontal portion 231 with bolts and nuts, or the like. Further, a rear end of the upper horizontal portion 231 is joined to the rear floor panel 220 and a rear cross 280 that is a frame member extending in the vehicle width direction.

The lower horizontal portion 233 is formed on the front side of the vehicle relative to the upper horizontal portion 231, and is provided at a lower position in the vehicle height direction than the upper horizontal portion 231. The rear end flanged 152B, 154B of the battery pack 100 (more precisely, of the case cover 152 and the case tray 154) are detachably fastened to the lower horizontal portion 233 with bolts and nuts, or the like.

The fastening panel 230 has joint points 236A, 236B for the rear floor panel 220 at respective ends in the vehicle front-rear direction. No joint point is provided between the front and rear joint points 236A, 236B, and a seat support point 232A and a battery support point 234A are provided in this region. Therefore, when a load is input to the seat support point 232A, the load is transmitted to the battery support point 234A directly (without passing through the joint points).

Figure 4:
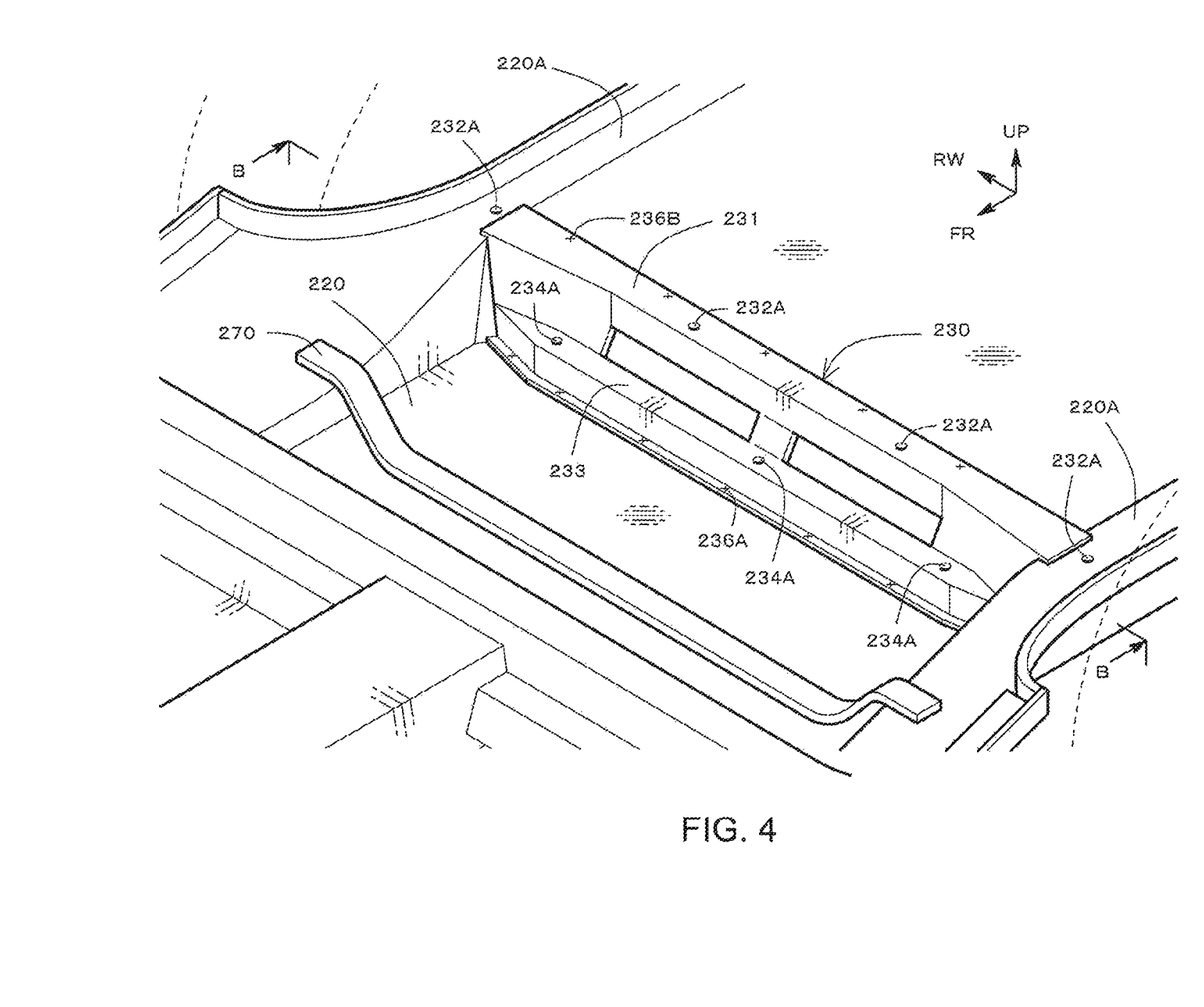
FIG. 4 is an enlarged perspective view showing an example of a battery storage space of FIG. 1.

FIG. 4 shows a perspective view of the fastening panel 230 as an example. The fastening panel 230 extends in the vehicle width direction, and both of the ends are joined to rear side portions 220A of the rear floor and 220 and rear side members 250 which are frame members with opening portions covered by the rear side portions 220A as shown, for example, in FIG. 6.

Referring to FIG. 4, a plurality of seat support points 232A are formed along the vehicle width direction of the upper horizontal portion 231 and on the rear side portions 220A on an extended line in the vehicle width direction. Each of the seat support points 232A represents a support point for supporting the seat rail 372 through the seat rear bracket 320, and the seat support point 232A has, for example, a fastening hole piercing in the thickness direction. The position of the fastening hole is aligned with the position of a fastening hole (not shown) of the seat rear bracket 320. By inserting a bolt or the like into the aligned fastening holes, the seat rear bracket 320 and the fastening panel 230 are fastened together.

Moreover, in the lower horizontal portion 233, a plurality of battery support points 234A are formed along the vehicle width direction. In each of the battery support points 234A, for example, a fastening hole piercing in the thickness direction is formed. The position of this fastening hole is aligned with the position of a fastening hole (not shown) provided in each of the rear end flanges 152B, 154B of the case 150 of the battery pack 100. By inserting a bolt or the like into the aligned fastening holes, the battery pack 100 and the fastening panel 230 are fastened together.

Figure 6:
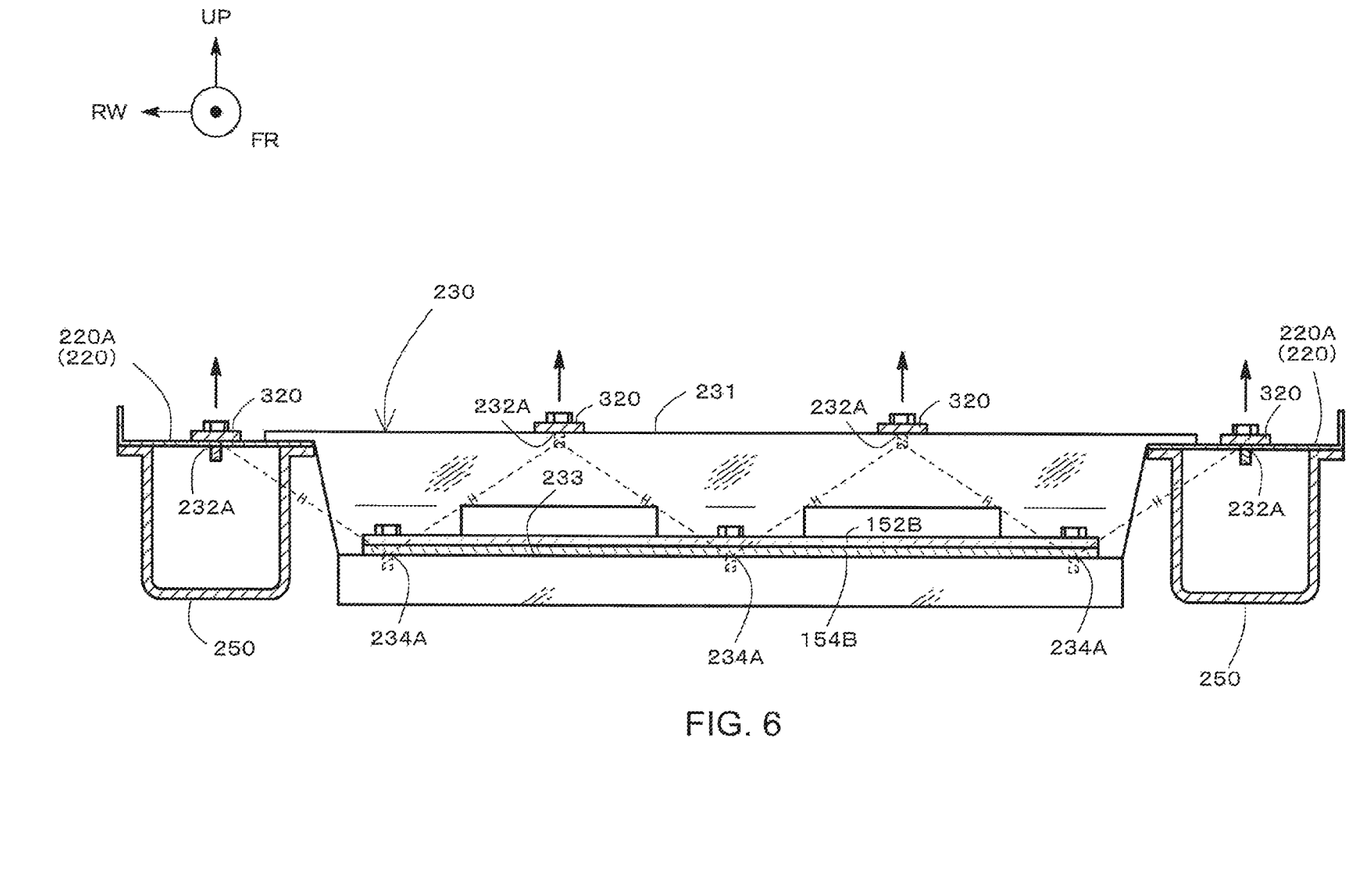
FIG. 6 is a B-B cross-sectional view of FIG. 4, and describes fastening points of a fastening panel that is a holding member.

Referring to FIGS. 4 and 6, the seat support points 232A and the battery support points 234A are arranged at different positions in the vehicle front-rear direction, but the separation distance between each of the seat support points 232A and the corresponding battery support point 234A is equal throughout the plurality of the seat support points 232A and the plurality of the battery support points 234A. As described later, with this equally distanced arrangement, a load applied to each seat support point 232A is evenly distributed to the plurality of the battery support points 234A through the fastening panel 230.

FIG. 5 shows a load transmission path when a load is input to the seat belt mechanism as an example. If the vehicle carrying an occupant or a crash test dummy in the rear seat 350 stops abruptly, the seat belt mechanism restrains the occupant or the crash test dummy in the rear seat 350 against the inertia. At this time, a tensile load toward the front of the vehicle is applied to the webbing shoulder portion 380 and the webbing waist portion 382. At this time, the tensile load is transmitted to the floor anchor 388 and the floor anchor 390 supporting the webbing waist portion 382 (see FIG. 2).

Further, the tensile load is transmitted to the seat rail 372 fastened to the floor anchors 388, 390 and the seat rear bracket 320 fastened to the seat rail 372. Furthermore, the tensile load is also transmitted to the fastening panel 230 fastened to the seat rear bracket 320 at the seat support point 232A.

When the input point of the tensile load is the webbing waist portion 382, tensile loads in the forward and upward directions of the vehicle are applied from the webbing waist portion 382 to the fastening panel 230 installed rearward and downward. At this time, particularly the upward tensile load is also transmitted to the battery pack 100 fastened to the fastening panel 230 through the battery support points 234A.

That is, a part of the load of pulling the floor anchors 388, 390 toward the front of the vehicle is decomposed into a load component for lifting the battery pack 100. At this time, the lifting is restrained by the weight of the battery pack 100, and, as a result, the displacement of the floor anchors 388, 390, for example, the angular displacement is restrained.

Referring to FIG. 6, the seat support points 232A of the fastening panel 230 are equally arranged in the vehicle width direction. Moreover, as described above, although the seat support points 232A and the battery support points 234A are arranged at different positions in the vehicle front-rear direction, the separation distance between each of the seat support points 232A and the corresponding battery support point 234A is equal throughout the plurality of the seat support points 232A and the plurality of the battery support points 234A.

With this equally distanced arrangement, a load applied to the seat support point 232A is evenly distributed to the plurality of the battery support points 234A through the fastening panel 230. By preventing uneven load distribution, it is possible to avoid concentration of the load only on a specific battery support point 234A.

The present disclosure is not limited to the present embodiment described above, and includes all changes and modifications without departing from the technical scope or the essence of the present disclosure defined by the claims.

The invention claimed is:

1. A vehicle lower structure comprising:
a battery pack disposed on a floor panel; and
a seat disposed on the battery pack, wherein
a floor anchor for supporting a waist portion of webbing of a seat belt mechanism is supported by a frame member of a seat cushion of the seat,
the frame member of the seat cushion is supported by the floor panel through a holding member, and
an end portion of the battery pack is supported by the floor panel through the holding member,
front and rear portions, in a vehicle front-rear direction, of the holding member is provided with joint points for the floor panel, and
in a region, between the joint points respectively provided at the front and the rear portions in the vehicle front-rear direction, where no joint point between the holding member and the floor panel is provided, a seat support point for the frame member and the holding member, and a battery support point for the end portion of the battery pack and the holding member are provided.

2. The vehicle lower structure according to claim 1, wherein
the holding member extends in a vehicle width direction,
the holding member has a plurality of seat support points and a plurality of battery support points, the seat support points and the battery support points being formed alternately along the vehicle width direction, and
a separation distance between each of the seat support points and the corresponding battery support point is equal throughout the plurality of the seat support points and the plurality of the battery support points.

3. The vehicle lower structure according to claim 1, wherein
the holding member includes a lower horizontal portion extending in a vehicle width direction, and a plurality of battery support points are formed in an upper surface of the lower horizontal portion.

* * * * *